May 14, 1929. W. SNIATOWSKI 1,713,403
SAFETY DEVICE FOR AUTOMOBILES
Filed Dec. 12, 1928 2 Sheets-Sheet 1
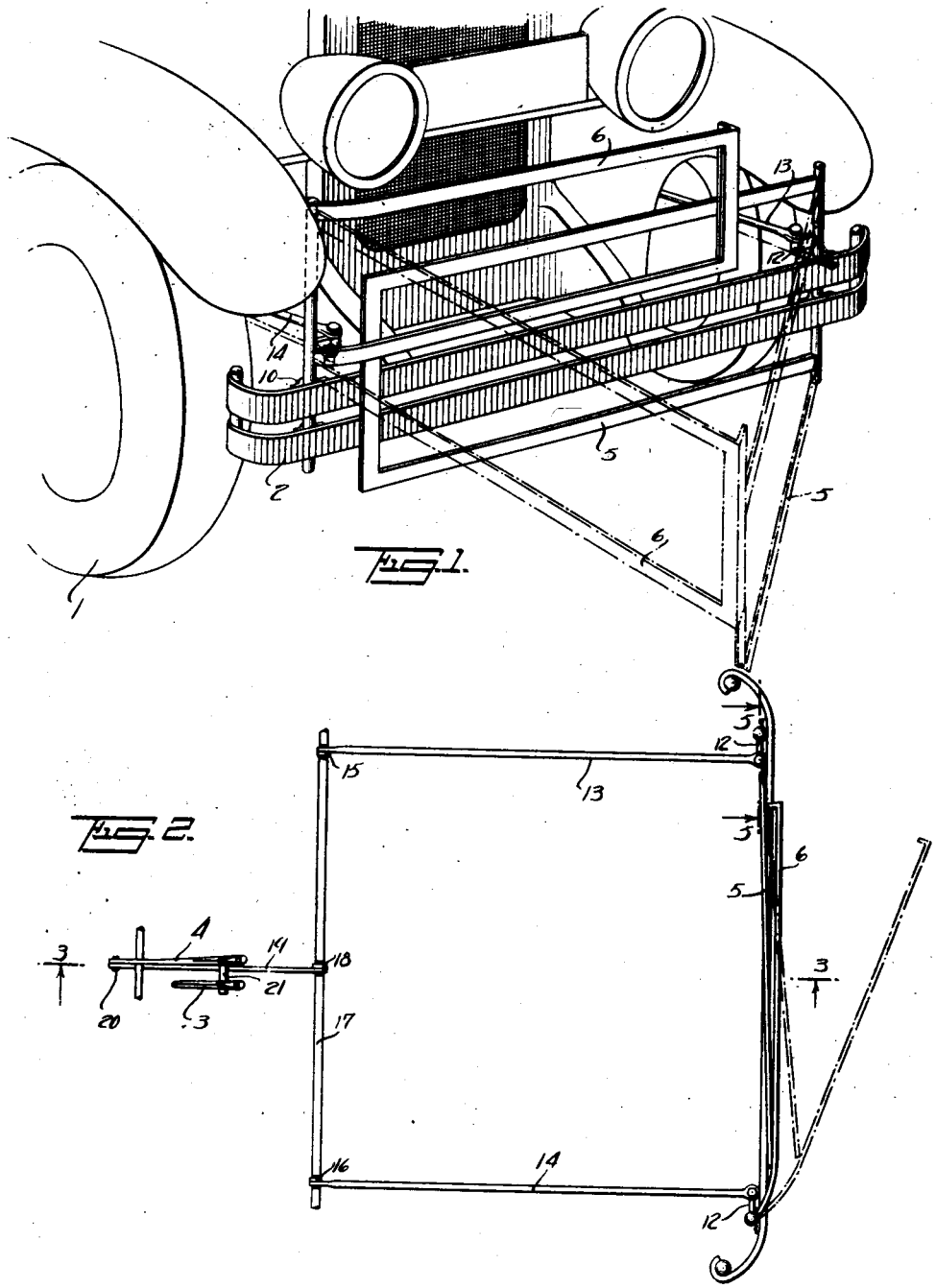
WITNESSES
INVENTOR
Walter Sniatowski
BY
ATTORNEY

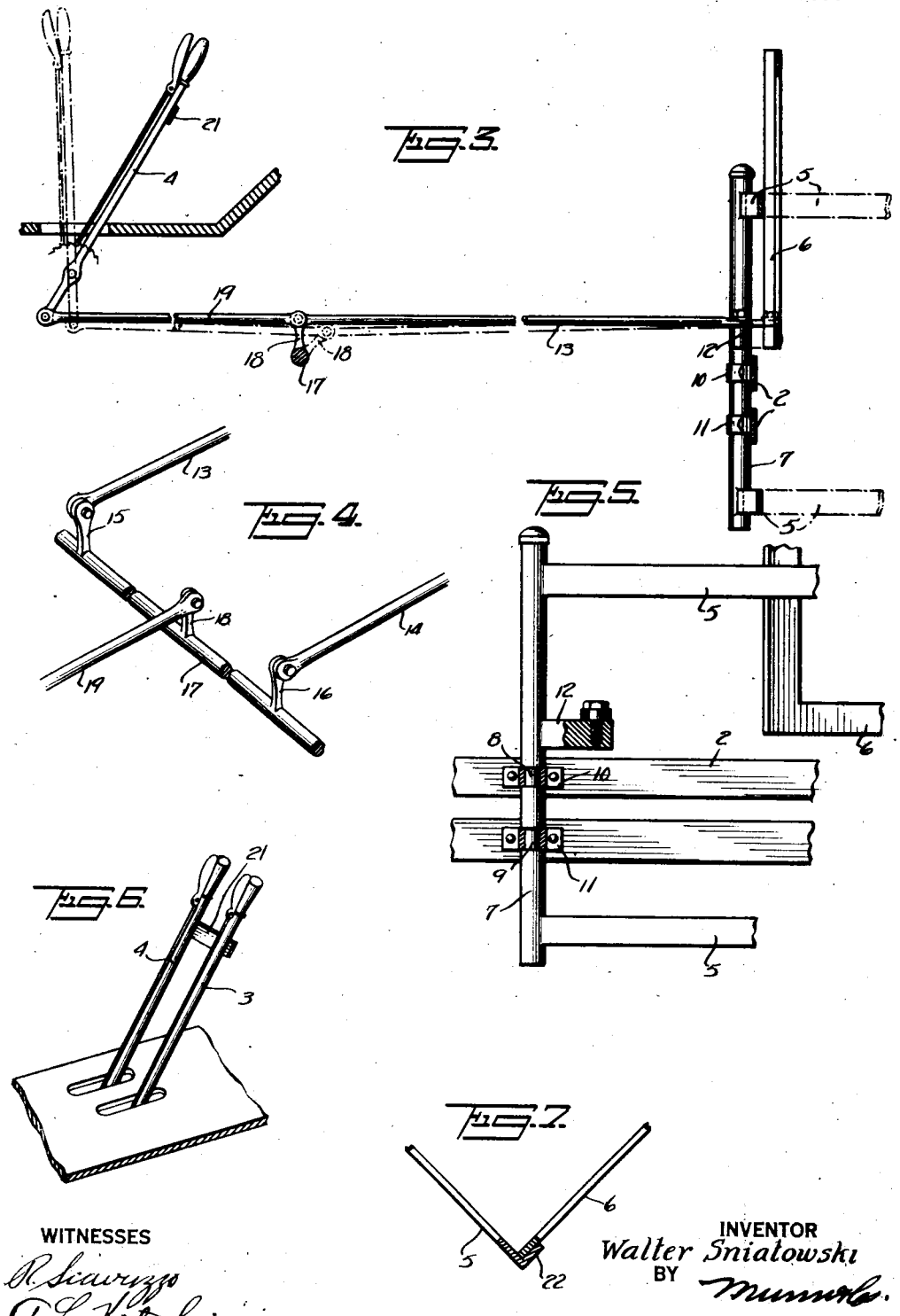

Patented May 14, 1929.

1,713,403

UNITED STATES PATENT OFFICE.

WALTER SNIATOWSKI, OF NEW YORK, N. Y.

SAFETY DEVICE FOR AUTOMOBILES.

Application filed December 12, 1928. Serial No. 325,537.

This invention relates to safety devices for automobiles, and has for an object to provide an improved construction wherein means are mounted adjacent the bumper of the automobile which may be manually actuated to push or throw pedestrians out of the way when an accident is imminent.

Another object of the invention is to provide a safety device for automobiles which involves a swinging guard member arranged in front of the automobile and operable by lever means from the driver's seat.

A still further object of the invention is to provide a forwardly and laterally swinging device at the front of an automobile which is operated by a lever adjacent the driver's seat and which automatically applies the emergency brake of the automobile when the operating lever is actuated.

In the accompanying drawings,—

Figure 1 is a perspective view of the front part of an automobile having a bumper and having an embodiment of the invention applied thereto;

Figure 2 is a top plan view of the device embodying the invention shown in Figure 1;

Figure 3 is an enlarged sectional view through Figure 2 on the line 3—3;

Figure 4 is a perspective view of a rock shaft and certain other parts embodying certain features of the invention;

Figure 5 is an enlarged fragmentary sectional view through Figure 1 on the line 5—5 of Figure 2;

Figure 6 is a fragmentary perspective view showing a safety device operating lever and its connection and association with the emergency brake lever of an automobile;

Figure 7 is a fragmentary sectional view through the front part of the safety device when in an outer position, the view illustrating how the parts interlock.

Referring to the accompanying drawings by numerals, 1 indicates an automobile of any desired kind, and 2 a bumper of any desired kind secured in any desired way to the automobile 1. The automobile 1 is provided with an emergency brake lever 3 which swings back and forth in the usual manner as it is operated. Normally the brake lever 3 is in the position shown in Figure 6 and may be moved at any time from that position individually or may be moved with the operating lever 4 when the operating lever is moved to an operated position. The operating lever 4 is adapted to operate or actuate the swinging guard frames 5 and 6 pivotally mounted on the automobile near the bumper and adapted to swing outwardly to force pedestrians to one side. The frames 5 and 6 may be made in any desired form but are preferably rectangular and at one end are each formed integral with or rigidly secured to pivot posts 7. It will be understood that there is a pivot post 7 for each frame. Each of these pivot posts is formed with cut-away portions 8 and 9, as shown in Figure 5, and suitable bearing clips 10 and 11 are used to pivotally support these posts in place. The clips 10 and 11 may be secured to bumper 2 or to any other part of the automobile. An extension 12 is carried by each post 7 and to the respective extensions are pivotally connected links or rods 13 and 14. These links are in turn pivotally connected to the outer ends of arms 15 and 16 (Figure 4), and these arms in turn are formed integral with or rigidly secured to a rock shaft 17. An arm 18 extends from rock shaft 17 and link 19 is pivotally connected therewith, said link in turn being pivotally connected at 20 to the actuating lever 4. This lever is provided with an abutment 21 adapted to overlap the lever 3 so that the lever 3 is always actuated with the lever 4, though lever 3 may be independently actuated.

When the device is in use ordinarily it is positioned as shown in full lines in Figure 1 with the lever mechanism as shown in Figure 3. In case anyone is in the way and is about to be hit the operator naturally does whatever is necessary to stop the car as soon as possible, and in addition, pulls lever 4 over to substantially the dotted position shown in Figure 3, whereupon the frames 5 and 6 will quickly swing out to the dotted position shown in Figure 1, and thereby push or crowd the person to one side. When the frames 5 and 6 are moved outwardly they assume a substantially V-shaped formation and frame 6 strikes the turned-over edge 22 of frame 5, thus interlocking the frames. The frames may be quickly swung back to their former position by releasing lever 4 and manually swinging the frames back to the position shown in Figure 3. After this has been done the emergency brake lever 3 is also moved back to its former inoperative position and then the car may proceed in the usual way. By reason of this construction and method of operation, persons who are about to be struck will be pushed or lightly thrown to one side so that the automobile will not strike or injure anyone.

What I claim is:—

1. A safety device for automobiles, comprising a pair of swinging guard members, means for mounting the same at the front of an automobile, and means including a manually-actuated lever for swinging said guard members from a position extending substantially transversely to the direction of travel of the automobile to a position almost parallel to the travel of an automobile, the movement of said guard members acting to push persons or articles out of the way of the automobile.

2. In a safety device for automobiles, a pair of swinging guard members, means for swingably mounting the guard members on the front of an automobile, a pair of links extending rearwardly from said last-mentioned means, a rock shaft for moving said links back and forth, and an actuating lever for rocking said rock shaft, whereby when said lever is moved in one direction said guard members will be swung outwardly and when moved in the opposite direction will be folded inwardly.

3. In a safety device for automobiles, a pair of guard members pivotally mounted on the front of the automobile, means for actuating said guard members, said means including an actuating manually operated lever and an abutment rigidly connected with said lever and overlapping the emergency brake lever of the automobile, whereby when said actuating lever has functioned said emergency lever will have been moved to an operated position.

4. In a safety device for automobiles, a pair of guard frames, a post rigidly secured to each frame, means carried by the automobile for pivotally supporting the post, an extension connected with each of said posts, a link pivotally connected with each of said extensions, a rock shaft for moving said links back and forth for moving the guard frames outwardly and inwardly, and an actuating lever for actuating said rock shaft.

5. In a safety device for automobiles, means arranged at the front of the automobile and supplementing the bumper for preventing persons from being run over, said means including a pair of swinging guard members for pushing persons to one side as the automobile moves along, and a mechanism including a manually-actuated lever for operating said members.

6. In a safety device for automobiles, a pair of frames pivotally mounted on the automobile near the front, one of the frames having an extension adapted to hook over the opposite frame when the frames are swung outwardly to a substantially V-shaped formation, link means for swinging said frames, a rock shaft for operating said link means, and a manually-actuated lever adapted to be positioned near the driver's seat for actuating said rock shaft.

Signed at Summit in the county of Union and State of New Jersey this 7th day of December, A. D. 1928.

WALTER SNIATOWSKI.